United States Patent
Raghunathan et al.

(10) Patent No.: US 11,388,720 B2
(45) Date of Patent: *Jul. 12, 2022

(54) METHODS AND APPARATUS FOR USER EQUIPMENT CAPABILITY EXCHANGE

(71) Applicant: QUALCOMM Incorporated, San Diego, CA (US)

(72) Inventors: Shravan Kumar Raghunathan, San Diego, CA (US); Muthukumaran Dhanapal, Sunnyvale, CA (US); Srinivasan Balasubramanian, San Diego, CA (US); Gavin Bernard Horn, La Jolla, CA (US); Aziz Gholmieh, Del Mar, CA (US); Parthasarathy Krishnamoorthy, San Diego, CA (US); Aiping Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 16/789,016

(22) Filed: Feb. 12, 2020

(65) Prior Publication Data

US 2020/0187189 A1 Jun. 11, 2020

Related U.S. Application Data

(63) Continuation of application No. 15/882,558, filed on Jan. 29, 2018, now Pat. No. 10,588,130.

(Continued)

(51) Int. Cl.
*H04W 72/04* (2009.01)
*H04W 8/22* (2009.01)
(Continued)

(52) U.S. Cl.
CPC .......... *H04W 72/048* (2013.01); *H04W 8/22* (2013.01); *H04W 8/24* (2013.01); *H04W 48/14* (2013.01);
(Continued)

(58) Field of Classification Search
None
See application file for complete search history.

(56) References Cited

U.S. PATENT DOCUMENTS

2013/0322370 A1* 12/2013 Fong ...................... H04W 8/24
370/329
2016/0262053 A1 9/2016 Palm et al.
(Continued)

OTHER PUBLICATIONS

International Search Report and Written Opinion—PCT/US2018/015854—ISA/EPO—dated Jun. 11, 2018.
(Continued)

*Primary Examiner* — Kouroush Mohebbi
(74) *Attorney, Agent, or Firm* — Norton Rose Fulbright LLP

(57) ABSTRACT

Capability exchange enhancements include filtering and/or indexing. In some aspects, a user equipment (UE) determines UE capabilities to be reported to a network based on one or more of: one or more enquiries from the network, received system information, a home operator policy, configuration associated with public land mobile network (PLMN) information of one or more networks, a user preference, or a service type. In other aspects, a UE may report a subset of UE capabilities for features used for the connection establishment. Following connection establishment, the UE may use an identifier to communicate a more complete set of modes of operation that the UE is currently capable of performing. Base stations of the network may share the reported subset so that the UE may avoid transmitting the subset to a target base station.

60 Claims, 12 Drawing Sheets

Related U.S. Application Data

(60) Provisional application No. 62/454,653, filed on Feb. 3, 2017.

(51) Int. Cl.
| | |
|---|---|
| *H04W 8/24* | (2009.01) |
| *H04W 76/11* | (2018.01) |
| *H04W 84/04* | (2009.01) |
| *H04W 88/08* | (2009.01) |
| *H04W 88/02* | (2009.01) |
| *H04W 48/14* | (2009.01) |

(52) U.S. Cl.
CPC .......... *H04W 76/11* (2018.02); *H04W 84/042* (2013.01); *H04W 88/02* (2013.01); *H04W 88/08* (2013.01)

(56) References Cited

U.S. PATENT DOCUMENTS

| | | | |
|---|---|---|---|
| 2018/0092085 A1* | 3/2018 | Shaheen | H04W 76/16 |
| 2018/0183551 A1* | 6/2018 | Chou | H04W 72/1268 |
| 2018/0227904 A1 | 8/2018 | Raghunathan et al. | |

OTHER PUBLICATIONS

Nokia Networks: "UE Capability Structure for Carrier Aggregation Enhancements", 3GPP Draft; R2-153135 CA B5C Capability Signalling V2, 3rd Generation Partnership Project (3GPP), Mobile Competence Centre; 650, Route Des Lucioles; F-06921 Sophia-Antipolis Cedex; France, vol. RAN WG2, No. Beijing, China; Aug. 24, 2015-Aug. 28, 2015 Aug. 23, 2015, XP051003941, Retrieved from the Internet: URL:http://http://www.3gpp.org/ftp/Meetings_3GPP_SYNC/RAN2/Docs/ [retrieved on Aug. 23, 2015]. 4 pages.
Partial International Search Report—PCT/US2018/015854—ISA/EPO—dated Apr. 12, 2018.
Qualcomm: Incorporated: "Capability Coordination across RATs", 3GPP Draft; R2-165644 Capability Coordination Across Rats, 3rd Generation Partnership Project (3GPP), Mobile Competence Centre; 650, Route Des Lucioles ; F-06921 Sophia-Antipolis Cedex; France, vol. RAN WG2, No. Gothenburg; Aug. 22, 2016-Aug. 26, 2016, Aug. 21, 2016 (Aug. 21, 2016), XP051127059, 6 Pages, Retrieved from the Internet: URL:http://www.3gpp.org/ftp/Meetings_3GPP_SYNC/RAN2/Docs/[retrieved on Aug. 21, 2016].

* cited by examiner

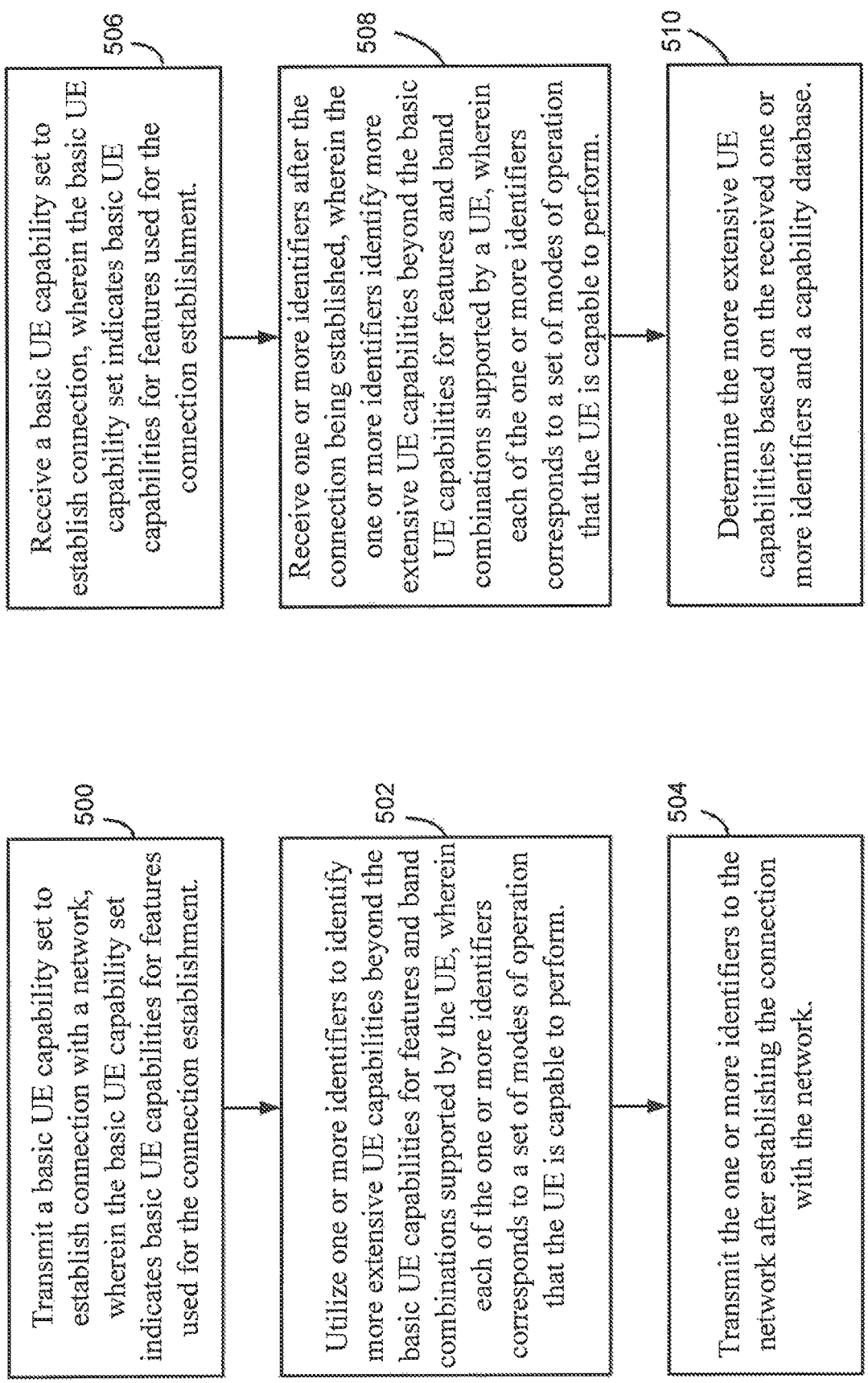

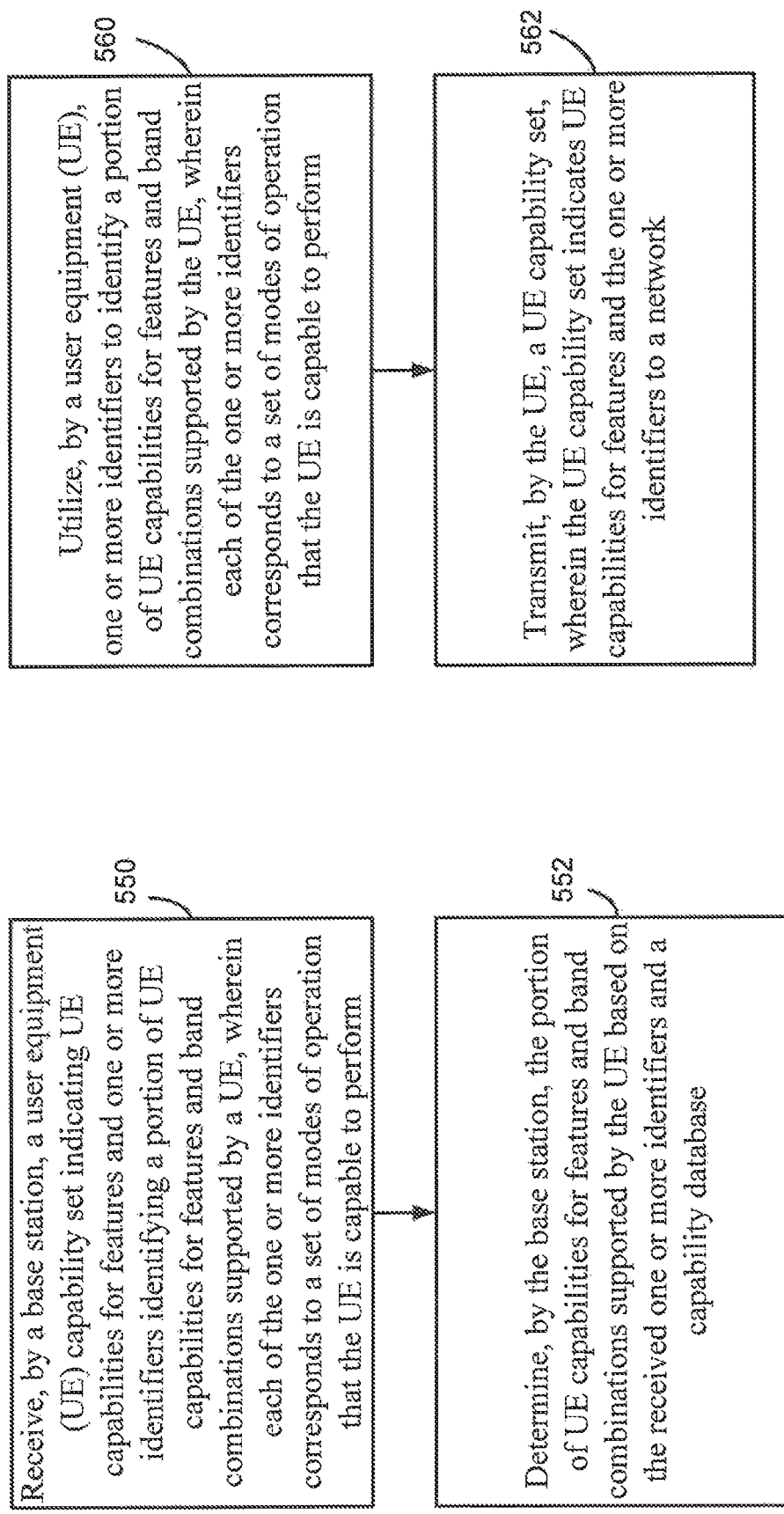

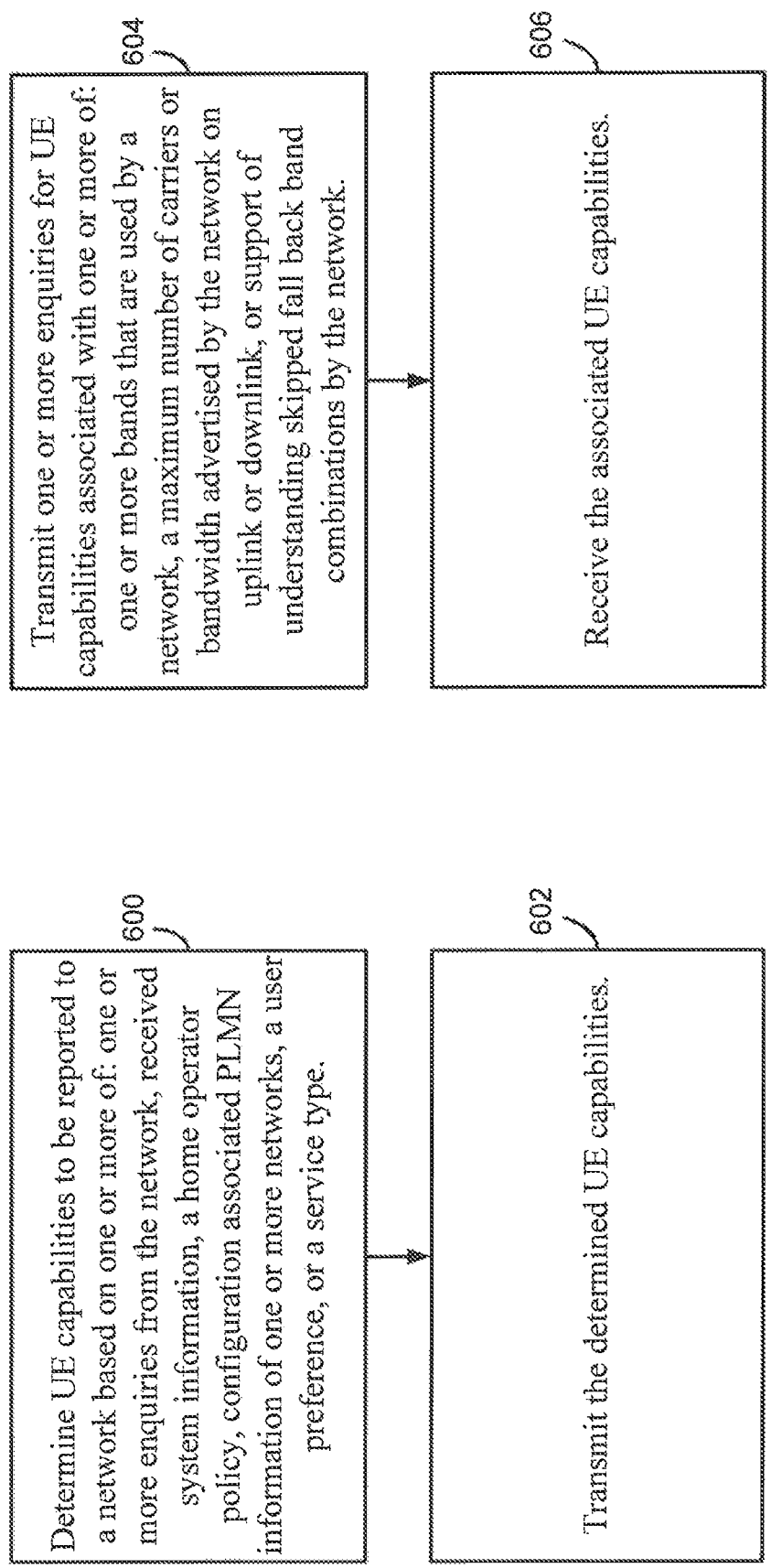

METHODS AND APPARATUS FOR USER EQUIPMENT CAPABILITY EXCHANGE

CROSS-REFERENCE TO RELATED APPLICATIONS

This application is a continuation of U.S. patent application Ser. No. 15/882,558, entitled "METHODS AND APPARATUS FOR USER EQUIPMENT CAPABILITY EXCHANGE," filed on Jan. 29, 2018, and claims the benefit of U.S. Provisional Patent Application No. 62/454,653, entitled "METHODS AND APPARATUS FOR USER EQUIPMENT CAPABILITY EXCHANGE," filed on Feb. 3, 2017, which is expressly incorporated by reference herein in its entirety.

BACKGROUND

Field

Aspects of the present disclosure relate generally to wireless communication systems, and more particularly, to user equipment capability exchange procedures.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

As LTE release and 5G release develop and add more features and carrier aggregation (CA)/band combinations, UE capability information has become one of the longest and most complicated radio access control messages. Therefore, enhancements to the UE capability change procedure may be helpful to address this issue.

SUMMARY

In an aspect of the disclosure, a method for wireless communication is disclosed. The method includes determining, by a user equipment (UE), UE capabilities to be reported to a network based on one or more of: one or more enquiries from the network, received system information, a home operator policy, configuration associated with public land mobile network (PLMN) information of one or more networks, a user preference, or a service type, and transmitting, by the UE, the determined UE capabilities.

In an additional aspect of the disclosure, a method for wireless communication is disclosed. The method includes transmitting, by a base station, one or more enquiries for user equipment (UE) capabilities associated with one or more of: one or more bands that are used by a network, a maximum number of carriers or bandwidth advertised by the network on uplink or downlink, or support of understanding skipped fall back band combinations by the network, and receiving, by the base station, the associated UE capabilities.

In an additional aspect of the disclosure, a method for wireless communication is disclosed. The method includes utilizing, by a user equipment (UE), one or more identifiers to identify a portion of UE capabilities for features and band combinations supported by the UE, and transmitting, by the UE, a UE capability set and the one or more identifiers to a network. The UE capability set indicates UE capabilities for features. Each of the one or more identifiers corresponds to a set of modes of operation that the UE is capable to perform;

In an additional aspect of the disclosure, a method for wireless communication is disclosed. The method includes receiving, by a base station, a user equipment (UE) capability set indicating UE capabilities for features and one or more identifiers identifying a portion of UE capabilities for features and band combinations supported by a UE, and determining, by the base station, the portion of UE capabilities for features and band combinations supported by the UE based on the received one or more identifiers and a capability database. Each of the one or more identifiers corresponds to a set of modes of operation that the UE is capable to perform;

In an additional aspect of the disclosure, an apparatus for wireless communication is disclosed. The apparatus includes means for determining, by a user equipment (UE), UE capabilities to be reported to a network based on one or more of: one or more enquiries from the network, received system information, a home operator policy, configuration associated with public land mobile network (PLMN) information of one or more networks, a user preference, or a service type, and means for transmitting, by the UE, the determined UE capabilities.

In an additional aspect of the disclosure, an apparatus for wireless communication is disclosed. The apparatus includes means for transmitting, by a base station, one or more enquiries for user equipment (UE) capabilities associated with one or more of: one or more bands that are used by a network, a maximum number of carriers or bandwidth advertised by the network on uplink or downlink, or support of understanding skipped fall back band combinations by the network, and means for receiving, by the base station, the associated UE capabilities.

In an additional aspect of the disclosure, an apparatus for wireless communication is disclosed. The apparatus includes means for utilizing, by a user equipment (UE), one or more identifiers to identify a portion of UE capabilities for features and band combinations supported by the UE, and means for transmitting, by the UE, a UE capability set. The UE capability set indicates UE capabilities for features and the one or more identifiers to a network. Each of the one or more identifiers corresponds to a set of modes of operation that the UE is capable to perform.

In an additional aspect of the disclosure, an apparatus for wireless communication is disclosed. The apparatus includes means for receiving, by a base station, a user equipment (UE) capability set indicating UE capabilities for features and one or more identifiers identifying a portion of UE capabilities for features and band combinations supported by a UE, and means for determining, by the base station, the portion of UE capabilities for features and band combinations supported by the UE based on the received one or more identifiers and a capability database. Each of the one or more identifiers corresponds to a set of modes of operation that the UE is capable to perform.

In an additional aspect of the disclosure, a non-transitory computer-readable medium having program code recorded thereon. The program code further includes program code executable by a computer for causing the computer to determine, by a user equipment (UE), UE capabilities to be reported to a network based on one or more of: one or more enquiries from the network, received system information, a home operator policy, configuration associated with public land mobile network (PLMN) information of one or more networks, a user preference, or a service type, and program code executable by the computer for causing the computer to transmit, by the UE, the determined UE capabilities.

In an additional aspect of the disclosure, a non-transitory computer-readable medium having program code recorded thereon. The program code further includes program code executable by a computer for causing the computer to transmit, by a base station, one or more enquiries for user equipment (UE) capabilities associated with one or more of: one or more bands that are used by a network, a maximum number of carriers or bandwidth advertised by the network on uplink or downlink, or support of understanding skipped fall back band combinations by the network, and program code executable by the computer for causing the computer to receive, by the base station, the associated UE capabilities.

In an additional aspect of the disclosure, a non-transitory computer-readable medium having program code recorded thereon. The program code further includes program code executable by a computer for causing the computer to utilize, by a user equipment (UE), one or more identifiers to identify a portion of UE capabilities for features and band combinations supported by the UE, and program code executable by the computer for causing the computer to transmit, by the UE, a UE capability set and the one or more identifiers to a network. The UE capability set indicates UE capabilities for features. Each of the one or more identifiers corresponds to a set of modes of operation that the UE is capable to perform, In an additional aspect of the disclosure, a non-transitory computer-readable medium having program code recorded thereon. The program code further includes program code executable by a computer for causing the computer to receive, by a base station, a user equipment (UE) capability set indicating UE capabilities for features and one or more identifiers identifying a portion of UE capabilities for features and band combinations supported by a UE, and program code executable by a computer for causing the computer to determine, by the base station, the portion of UE capabilities for features and band combinations supported by the UE based on the received one or more identifiers and a capability database. Each of the one or more identifiers corresponds to a set of modes of operation that the UE is capable to perform.

In an additional aspect of the disclosure, an apparatus configured for wireless communication is disclosed. The apparatus includes at least one processor, and a memory coupled to the processor. The processor is configured to determine, by a user equipment (UE), UE capabilities to be reported to a network based on one or more of: one or more enquiries from the network, received system information, a home operator policy, configuration associated with public land mobile network (PLMN) information of one or more networks, a user preference, or a service type, and to transmit, by the UE, the determined UE capabilities.

In an additional aspect of the disclosure, an apparatus configured for wireless communication is disclosed. The apparatus includes at least one processor, and a memory coupled to the processor. The processor is configured to transmit, by a base station, one or more enquiries for user equipment (UE) capabilities associated with one or more of: one or more bands that are used by a network, a maximum number of carriers or bandwidth advertised by the network on uplink or downlink, or support of understanding skipped fall back band combinations by the network, and to receive, by the base station, the associated UE capabilities.

In an additional aspect of the disclosure, an apparatus configured for wireless communication is disclosed. The apparatus includes at least one processor, and a memory coupled to the processor. The processor is configured to utilize, by a user equipment (UE), one or more identifiers to identify a portion of UE capabilities for features and band combinations supported by the UE, and to transmit, by the UE, a UE capability set and the one or more identifiers to a network. The UE capability set indicates UE capabilities for features. Each of the one or more identifiers corresponds to a set of modes of operation that the UE is capable to perform.

In an additional aspect of the disclosure, an apparatus configured for wireless communication is disclosed. The apparatus includes at least one processor, and a memory coupled to the processor. The processor is configured to receive, by a base station, a user equipment (UE) capability set indicating UE capabilities for features and one or more identifiers identifying a portion of UE capabilities for features and band combinations supported by a UE, and to determine, by the base station, the portion of UE capabilities for features and band combinations supported by the UE based on the received one or more identifiers and a capability database. Each of the one or more identifiers corresponds to a set of modes of operation that the UE is capable to perform;

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5A is a functional block diagram illustrating exemplary blocks executed to implement one aspect of the present disclosure.

FIG. 5B is a functional block diagram illustrating exemplary blocks executed to implement one aspect of the present disclosure.

FIG. 5D is a functional block diagram illustrating exemplary blocks executed to implement one aspect of the present disclosure.

FIG. 5E is a functional block diagram illustrating exemplary blocks executed to implement one aspect of the present disclosure.

FIG. 6A is a functional block diagram illustrating exemplary blocks executed to implement other aspects of the present disclosure.

FIG. 6B is a functional block diagram illustrating exemplary blocks executed to implement other aspects of the present disclosure.

DETAILED DESCRIPTION

Figure 1:
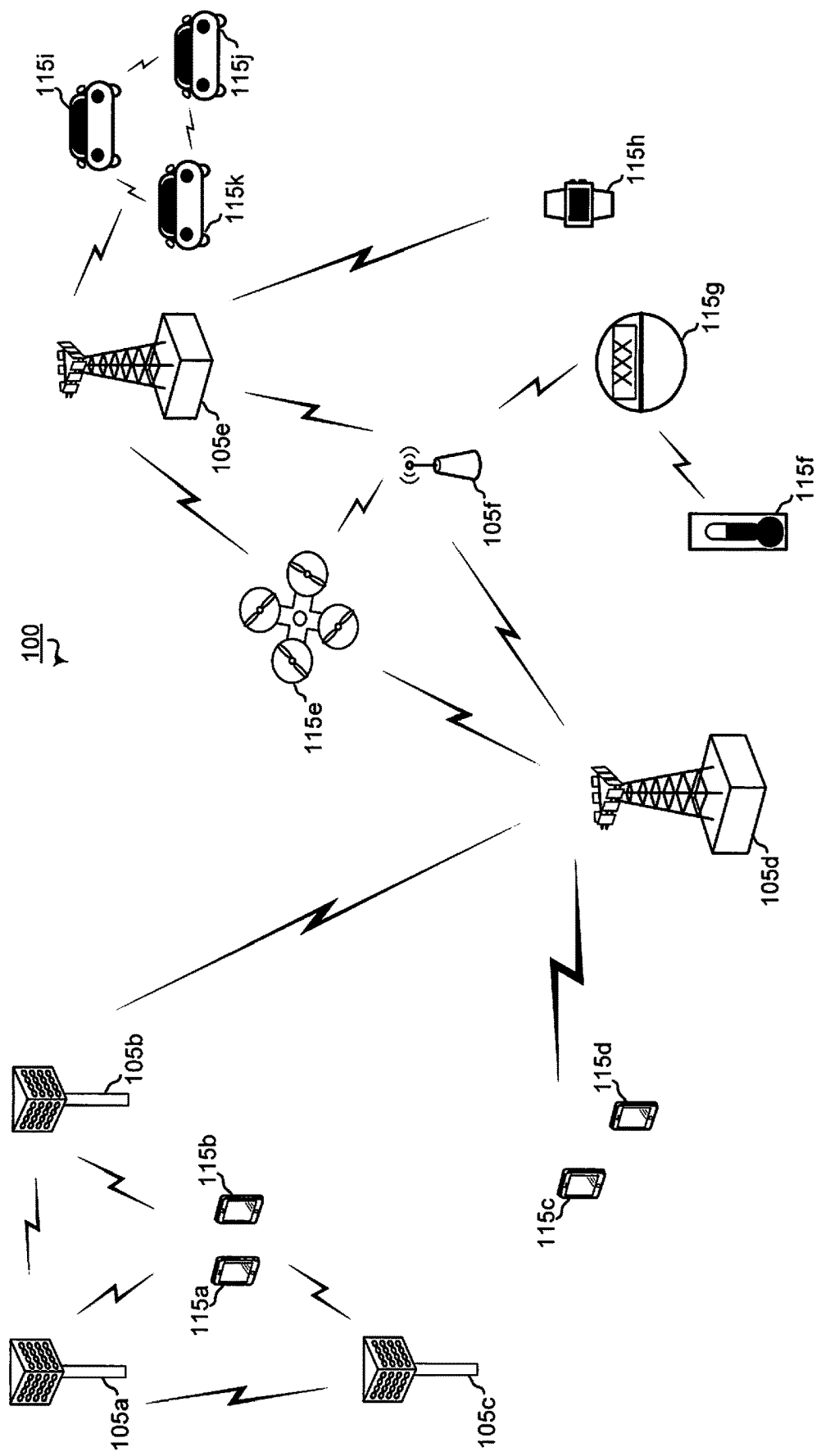
FIG. 1 is a block diagram illustrating details of a wireless communication system.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting.

Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
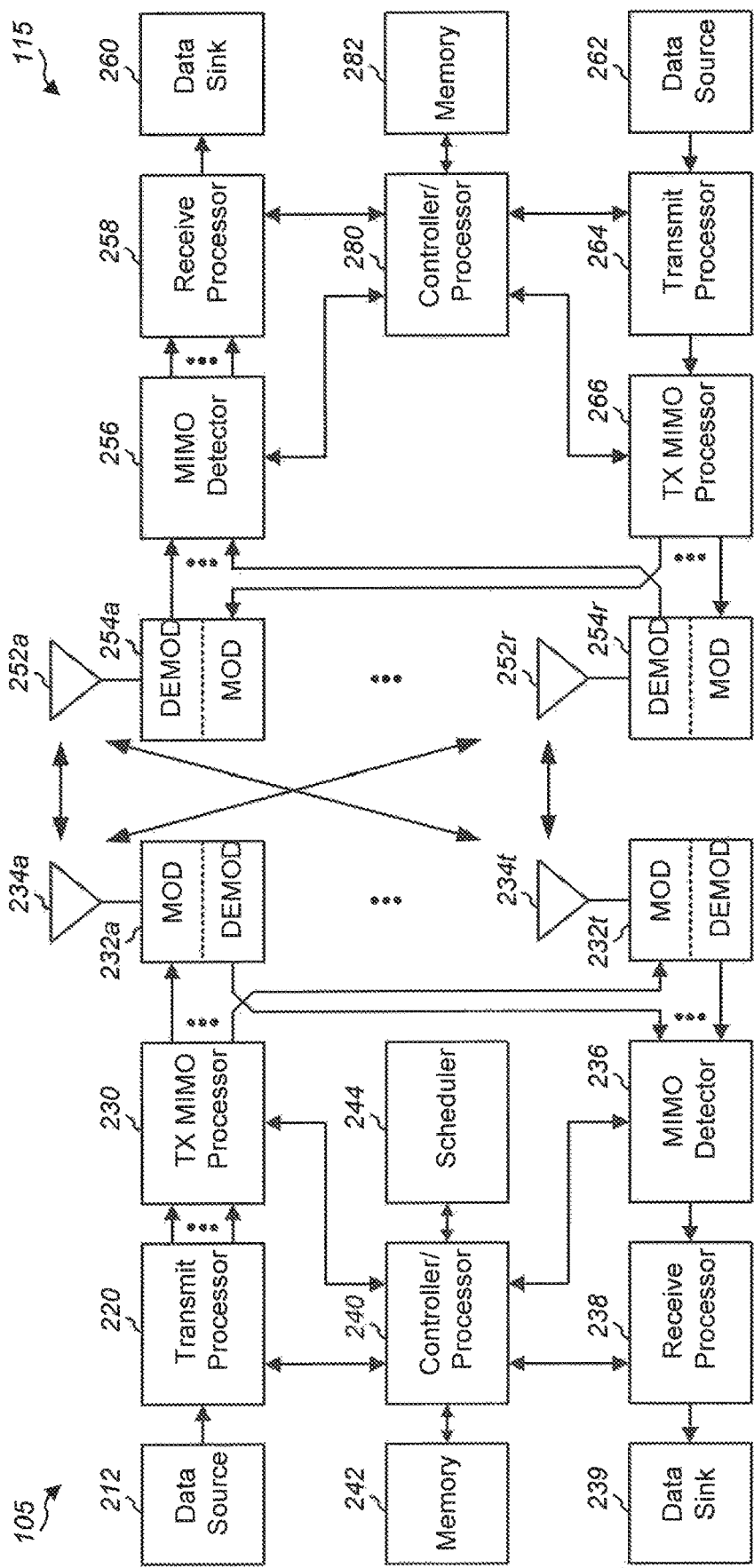
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 5-6, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
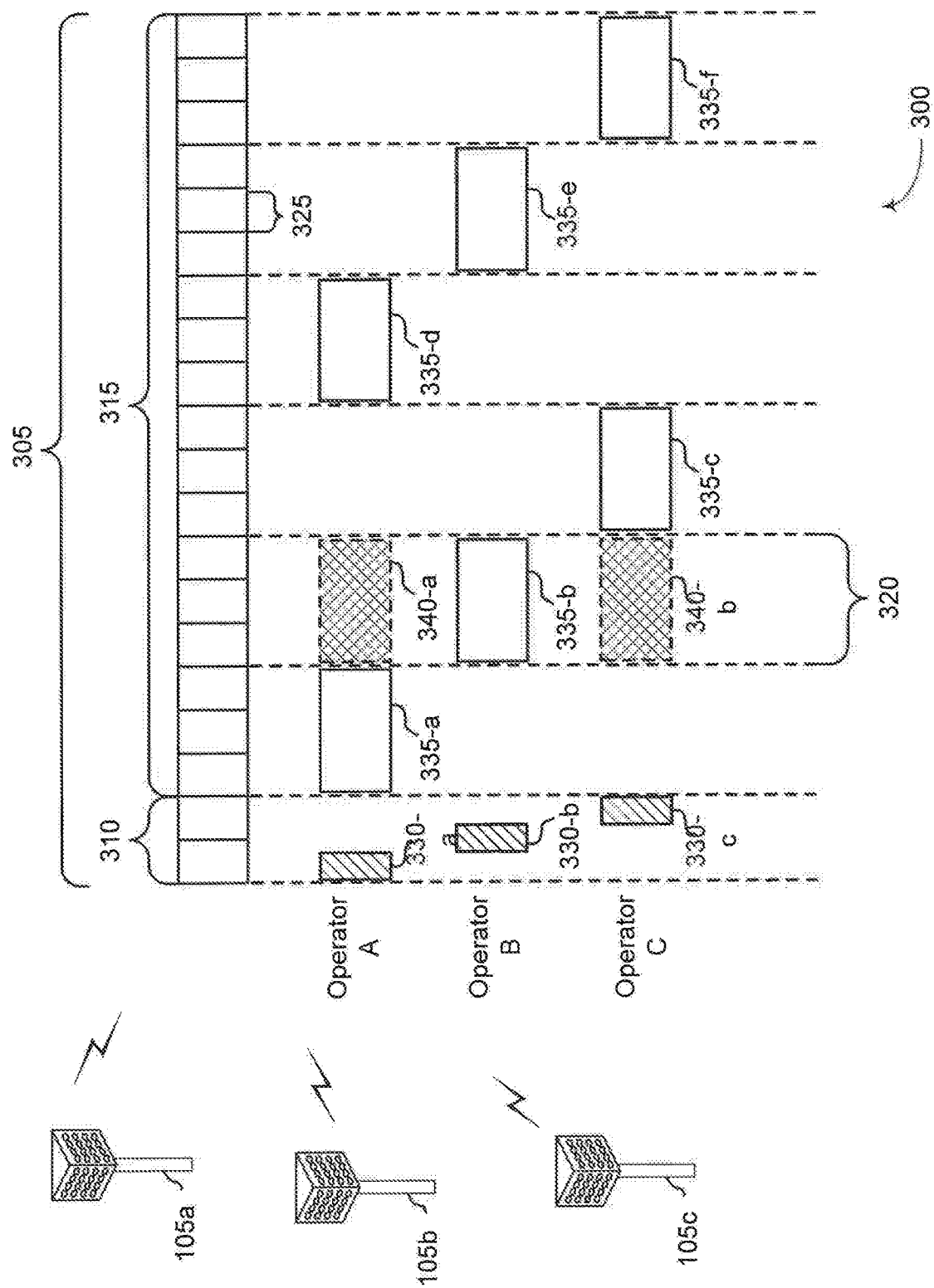
FIG. 3 illustrates an example of a timing diagram for coordinated resource partitioning.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250 μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain 0-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

UE capability information is a radio resource control (RRC) message that a UE provides to a network. It includes the details of UE capabilities. As LTE release and 5G release develop and add more features, such as MIMO, network-assisted interference cancellation and suppression (NAICS), dual connectivity, uplink carrier aggregation, number of CSI processes, etc., and carrier aggregation (CA)/band combinations, such as 5G plus LTE band combinations, 5G plus wireless local access network (WLAN) band combinations, etc., UE capability information has become one of the longest and most complicated RRC messages. Due to the increase in the message size of UE capability information, network operating entities may be unable to adequately process the received UE capability information, eventually leading to a failure of the LTE or 5G attach procedure. However, the existing UE capability exchange procedure cannot resolve this issue because it only randomly limits the UE capability information to be transmitted in regards to certain bands or number of carriers. As a result, a network operating entity may fail to obtain necessary UE capability information.

Various aspects of the present disclosure provide enhancements for UE capability exchange procedures to reduce the message size of UE capability information. Accordingly, network loading on the uplink may be reduced. Also, the time for transmitting UE capability information and the failure rate of LTE or 5G attach procedure may be reduced. Further, power saving on the UE may be significant.

In one aspect of the present disclosure, a UE may report a basic UE capability set to a network in order to quickly establish communication connections, and then utilize an indexing system to report to the network an index or an identifier identifying more extensive UE capabilities, instead of transmitting the more extensive UE capability information itself. In response, the network may determine the identified UE capabilities based on the received index or identifier and a capability database. In further aspects of the present disclosure, a UE may determine UE capabilities to be transmitted based on various resources or enquiries. In response, the network may receive such UE capabilities with reduced size.

Figure 4:
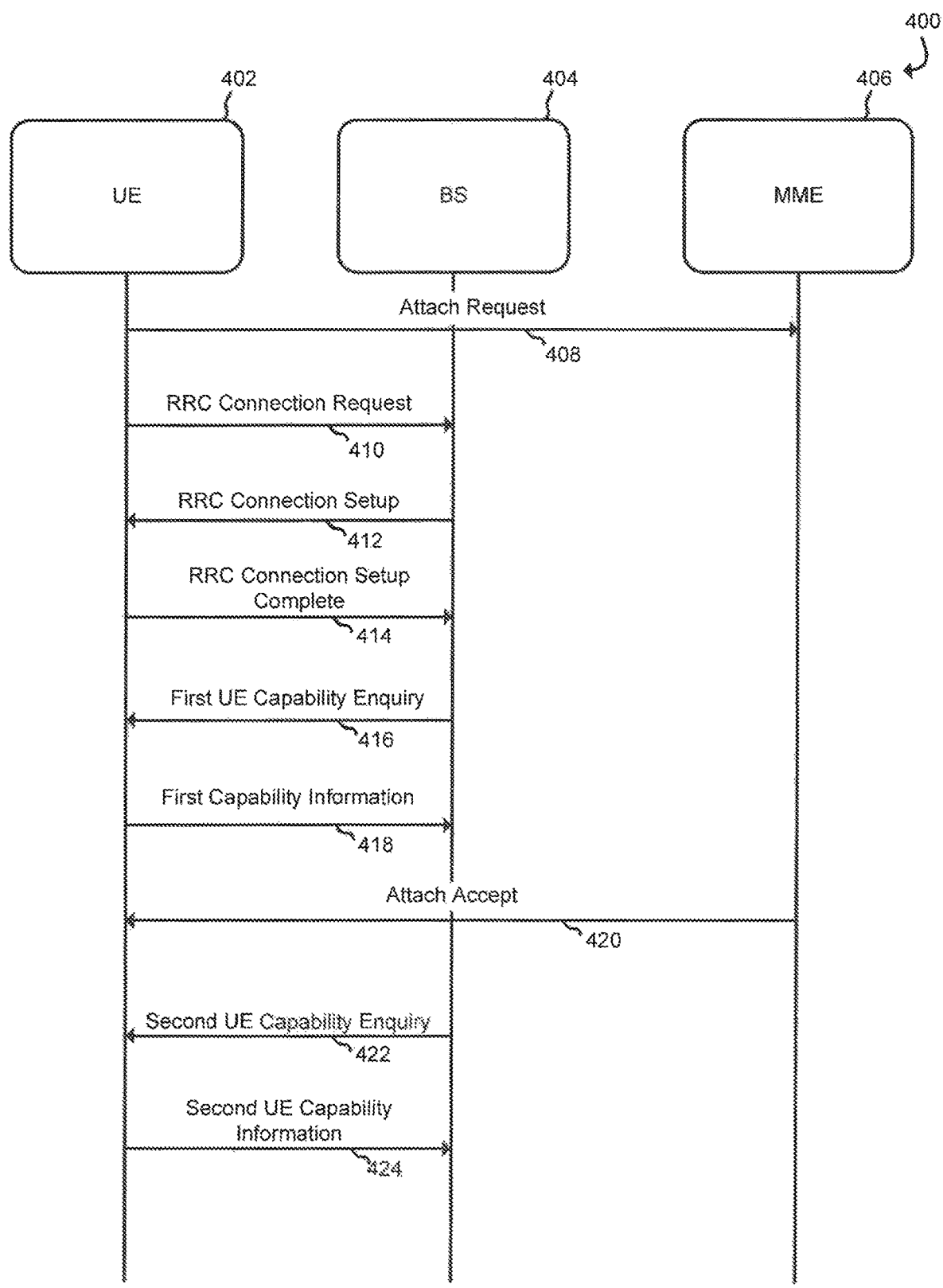
FIG. 4 illustrates a call flow diagram including a UE capability exchange procedure.

FIG. 4 illustrates a call flow diagram 400 including a UE capability exchange procedure. Call flow diagram 400 illustrates a communication procedure among UE 402, base station (BS) 404, and mobility management entity (MME) 406. UE 402 and BS 404 may have the same or similar configuration as the configuration of UE 115 and BS 105, as illustrated in FIG. 2. At 408 and 410, UE 402 may submit an attach request to MME 406 and an RRC connection request to BS 404. At 412 and 414, RRC connection may be set up between UE 402 and BS 404. After RRC connection setup, UE 402 may be authenticated by the network (not illustrated in FIG. 4). At 416, BS 404 may transmit a first UE capability enquiry to UE 402. In response, at 418 and 420, UE 402 may transmit first UE capability information to BS 404, and be accepted by MME 406 to attach to the network. After attaching to the network, at 422, BS 404 may transmit a second UE capability enquiry to UE 402. In response, at 424, UE 402 may transmit second UE capability information to BS 404. The transmissions of enquires may be through a Boolean or any other indication in the UE capability exchange procedure or over-the-air from BS 404 to UE 402.

In operation according to embodiments herein, the first UE capability information may be a basic UE capability set that includes basic UE capabilities for features required to establish connection with a network. The first UE capability information may not include all the details of UE capabilities. For example, the basic UE capability set may indicate UE capabilities in regards to MIMO support ability, IP address, UE location, UE power level, or other administration requirements for establishing a call. Since only basic UE capabilities are transmitted, the message size of the first UE capability information would not be too long or complicated. Therefore, the connection can be quickly established.

In some aspects of the present disclosure, UE 402 may provide a tag indicating its association with the basic UE capability set, and transmit this tag along with the basic UE capability set. This "tagged" basic UE capability set may be exchanged among BS 404 and other base stations in the same network. Therefore, upon a handover, a target base station, which UE 402 is going to handover to from BS 404, may not need to send UE 402 an enquiry for the basic UE capability set of UE 402. Accordingly, the uplink resources and UE power can be saved.

The second UE capability information may be one or more identifiers that are used to index the more extensive UE capabilities according to embodiments herein. For example, the more extensive UE capabilities are beyond the basic UE capabilities required to attach to a network. The more extensive UE capabilities may include inter-band, UL/DL carrier aggregation, and band combinations supportability, etc. In operation according to embodiments, UE 402 may transmit to BS 404 the identifiers identifying the more extensive UE capabilities, instead of transmitting the more extensive UE capabilities themselves. In response, BS 404 may process the received identifiers by referring to a capability database. The capability database may include a plurality of identifiers identifying a plurality of sets of two or more UE capabilities. The plurality of identifiers and their corresponding sets of UE capabilities may, for example, be agreed upon by both UE 402 and BS 404 and determined based on one or more of: pre-defined 3GPP Standards, a definition provided by a network operator, or a database provided by a UE vendor. For example, the network operator of BS 404 may index a set of UE capabilities previously received from a UE with one or more identifiers as part of a UE profile. As a further example, UE 402 may provide BS 404 with a uniform resource locator (URL) linking to an identifier database established by the UE vendor.

The identifiers may include one or more indices indicating band combinations, a release identifier, a device type identifier, or a feature specific identifier. For example, an index value may identify a set of bands supported by a UE. A release identifier may identify a set of UE capabilities deployed under a certain 3GPP release. A device type identifier may identify a set of UE capabilities provided by a certain device type. A feature specific identifier may identify a set of UE capabilities associated with a specific feature as deployment of a specific feature may impact a number of UE capabilities. In some aspects of the present disclosure, the basic UE capabilities may be also indexed with one or more identifiers. In this case, UE 402 may only transmit to BS 404 one or more identifiers to identify both basic UE capabilities and more extensive UE capabilities.

Each of the identifiers may correspond to a set of modes of operation that UE 402 is capable to perform. An identifier may correspond to multiple modes of operation. For example, a release identifier "I" may correspond to Mode A regarding UL/DL carrier aggregation ability, Mode B regarding dual connectivity, Mode C regarding multi-carrier supportability, etc. As a further example, a device type identifier "II" may correspond to Mode D regarding multiple SIM (MSIM), Mode E regarding single SIM (SSIM), etc.

When UE capabilities change, the mode of operation may also change. For example, UE 402 identified by the device type identifier "II" may initially operate under Mode D, but later change from Mode D to Mode E when the battery power becomes drained. Accordingly, UE 402 may report lower preferred capabilities in Mode E (SSIM mode). In some aspects of the present disclosure, UE 402 may indicate such change of mode of operation to BS 404.

In other aspects of the present disclosure, upon a change of UE capabilities, a UE may not be able to support all of the UE capabilities that are previously indexed and reported to a network. In other words, the UE may not be able to adapt its capabilities over time. For example, the UE may share resources between a wireless wide area network (WWAN) and a WLAN. WWAN loading may increase as WLAN may decrease over time. As a result, the UE may not be able to attach to a WLAN access point eventually. This situation may occur daily. To address this issue, the UE may update its capabilities to the network when the UE is unable to support the previously reported UE capabilities. The UE may update its capabilities during idle, inactive, or connected states. Alternatively, the UE may inform the network of a change of UE capabilities for the network to change the UE configuration of capabilities. In some aspects of the present disclosure, the UE may indicate a change of mode of operation, update UE capabilities, or inform the network of a change of UE capabilities during a UE capability exchange procedure or any other states.

FIG. 5A is a functional block diagram illustrating exemplary blocks executed by a UE to implement one aspect of the present disclosure. The example blocks may be implemented by UE 115, UE 402, or UE 700, as illustrated in FIGS. 1, 2, 4, and 7. At block 500, the UE may transmit a basic UE capability set to establish connection with a network. The basic UE capability set may indicate basic UE capabilities for features required for the connection establishment. At block 502, the UE may utilize one or more identifiers to identify more extensive UE capabilities for features and band combinations supported by the UE. Each of the one or more identifiers may correspond to a set of modes of operation that the UE is capable to perform. At block 504, the UE may transmit the one or more identifiers to the network after establishing the connection with the network.

FIG. 5B is a functional block diagram illustrating exemplary blocks executed by a base station to implement one aspect of the present disclosure. The example blocks may be implemented by base station 105, BS 404, or BS 800, as illustrated in FIGS. 1, 2, 4, and 8. At block 506, the base station may receive a basic UE capability set to establish connection. The basic UE capability set may indicate basic UE capabilities for features required for the connection establishment. In some aspects of the present disclosure, the base station may receive a tag transmitted along with the basic UE capability set. The tag may indicate an association between the basic UE capability set and the UE that transmits such basic UE capability set. The base station may transmit the received basic UE capability set to other base stations within the same network. Therefore, upon a handover, a target base station that already receives the tagged basic UE capability set from the base station may not need to enquire the UE for the basic UE capability set again. At block 508, the base station may receive one or more identifiers after the connection being established. The one or more identifiers may identify more extensive UE capabilities for features and band combinations supported by a UE. Each of the one or more identifiers may correspond to a set of modes of operation that the UE is capable to perform. In some aspects of the present disclosure, one or more enquiries for the basic UE capability set, the more extensive UE capabilities, or both may be transmitted through a Boolean or any other indication in the UE capability exchange procedure or over-the-air from the base station to the UE.

Figure 5C:
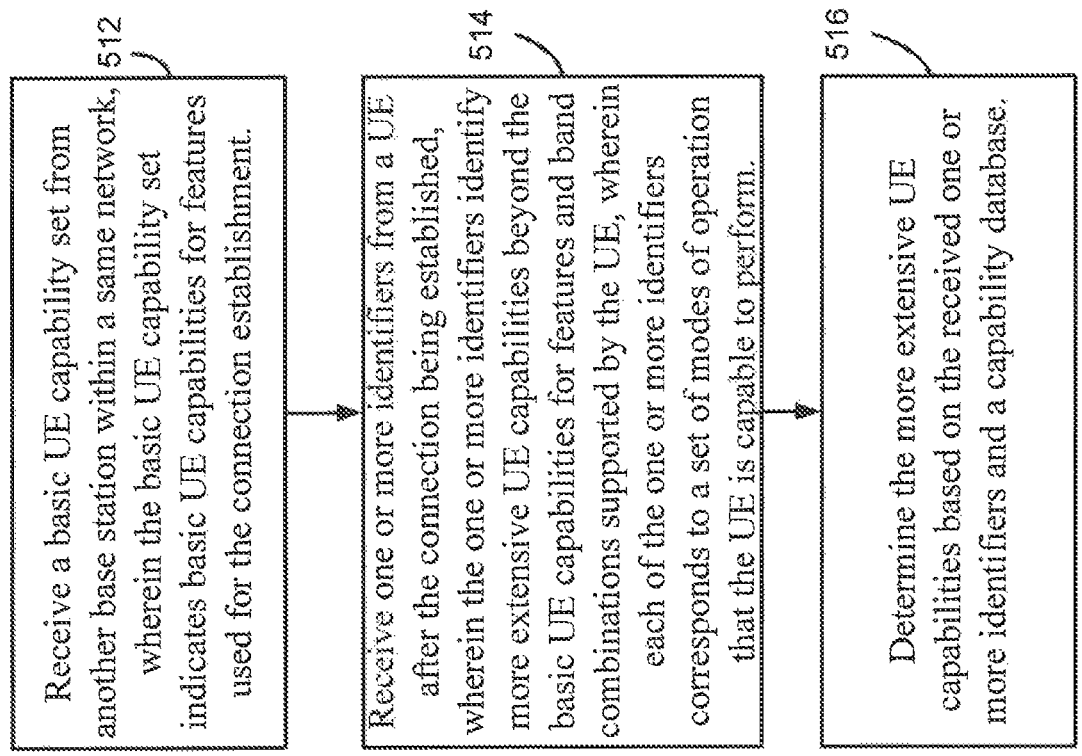
FIG. 5C is a functional block diagram illustrating exemplary blocks executed to implement one aspect of the present disclosure.

FIG. 5C is a functional block diagram illustrating exemplary blocks executed by a base station to implement one aspect of the present disclosure. The example blocks may be implemented by base station 105, BS 404, or BS 800, as illustrated in FIGS. 1, 2, 4, and 8. At block 512, the base station may receive a basic UE capability set from another base station within a same network. The basic UE capability set may indicate basic UE capabilities for features required for the connection establishment. At block 514, the base station may receive one or more identifiers from a UE after the connection being established. The one or more identifiers may identify more extensive UE capabilities for features and band combinations supported by the UE. Each of the one or more identifiers may correspond to a set of modes of operation that the UE is capable to perform. At block 516, the base station may determine the more extensive UE capabilities based on the received one or more identifiers and a capability database.

FIG. 5D is a functional block diagram illustrating exemplary blocks executed by a base station to implement one aspect of the present disclosure. The example blocks may be implemented by base station 105, BS 404, or BS 800, as illustrated in FIGS. 1, 2, 4, and 8. At block 550, the base station may receive a user equipment (UE) capability set indicating UE capabilities for features and one or more identifiers identifying a portion of UE capabilities for features and band combinations supported by a UE. Each of the one or more identifiers corresponds to a set of modes of operation that the UE is capable to perform. It is envisioned that the UE capabilities may be received for connection establishment. Alternatively or additionally, it is envisioned that the one or more identifiers may be received after connection establishment. It is further envisioned that the one or more identifiers may include one or more of: an index indicating the band combinations, a release identifier, a device type identifier, or a feature specific identifier. At block 552, the base station may determine the portion of UE capabilities for features and band combinations supported by the UE based on the received one or more identifiers and a capability database.

FIG. 5E is a functional block diagram illustrating exemplary blocks executed by a UE to implement one aspect of the present disclosure. The example blocks may be implemented by UE 115, UE 402, or UE 700, as illustrated in FIGS. 1, 2, 4, and 7. At block 560, the UE may utilize one or more identifiers to identify a portion of UE capabilities for features and band combinations supported by the UE. Each of the one or more identifiers corresponds to a set of modes of operation that the UE is capable to perform. At block 562, the UE may transmit, by the UE, a UE capability set. The UE capability set indicates UE capabilities for features and the one or more identifiers to a network. It is envisioned that the UE capabilities may be received for connection establishment. Alternatively or additionally, it is envisioned that the one or more identifiers may be received after connection establishment. It is further envisioned that the one or more identifiers may include one or more of: an index indicating the band combinations, a release identifier, a device type identifier, or a feature specific identifier.

Figure 7:
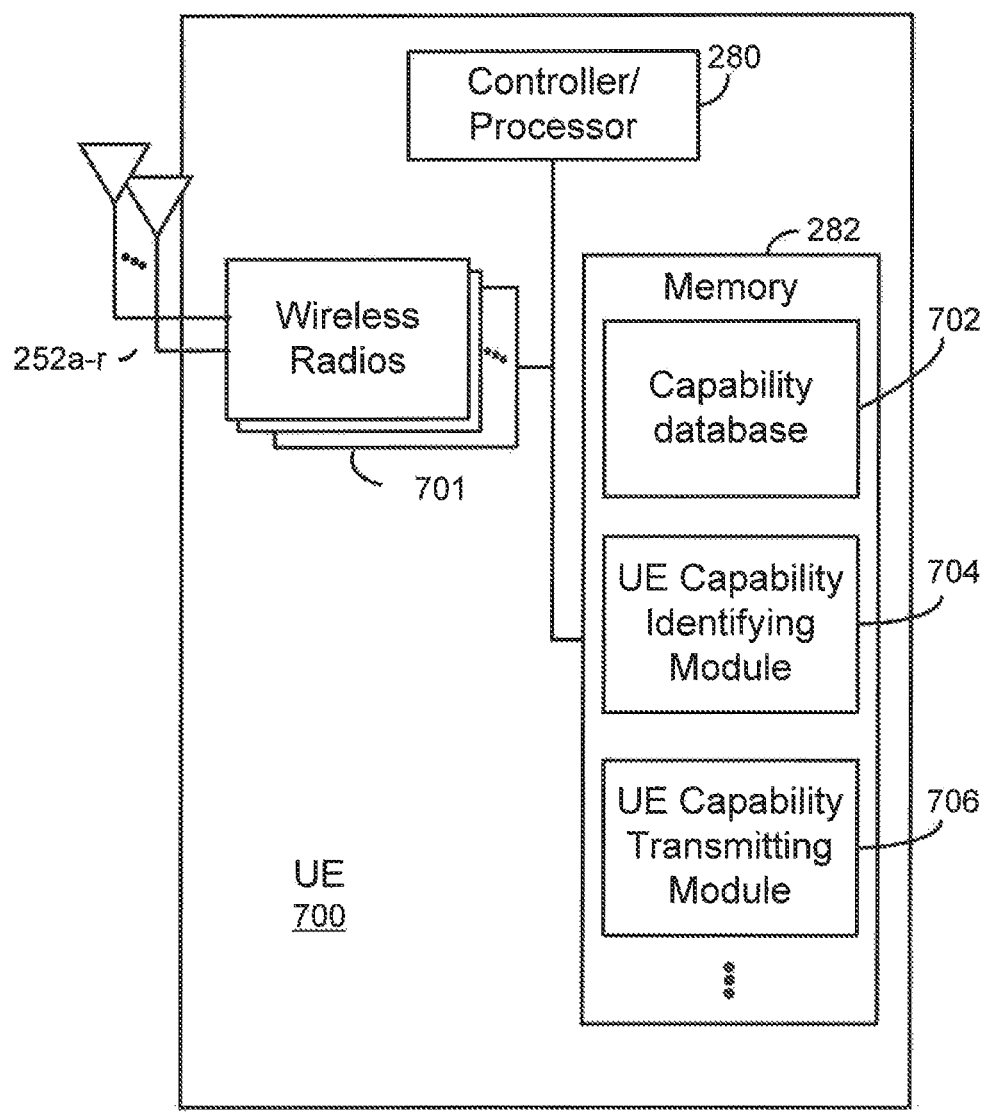
FIG. 7 is a block diagram of a UE in a communication network according to one aspect of the present disclosure.

FIG. 7 is a block diagram of a UE 700 in a communication network according to one aspect of the present disclosure. UE 700 may have the same or similar configuration as the configuration of UE 115 and UE 402, as illustrated in FIGS. 1, 2, and 4. UE 700 may include controller/processor 280 to perform or direct the execution of various processes or program codes stored in memory 282. UE 700 may further include wireless radios 701 to process uplink or downlink signals received from antennas 252*a-r*. Memory 282 may store capability database 702 and program codes for execution of UE capability identifying module 704, UE capability transmitting module 706, or other modules/applications. Capability database 702 may store one or more identifiers, indices, or modes of operation to identify band combinations or features supported by UE 700. Capability database 702 may also store a plurality of sets of UE capabilities corresponding to the identifiers, indices, or modes of operation. Capability database 702 may further store a basic UE capability set. Capability database 702 may be established based on pre-defined 3GPP Standards, definitions of identifiers or indices provided by a network operator or a UE vendor. The one or more identifiers or indices may be understood and assumed by both UE 700 and a base station exchanging UE capabilities with UE 700. UE capability identifying module 704 may be used to access capability database 702 and utilize one or more identifiers, indices, and/or modes of operation in capability database 702 to identify more extensive UE capabilities for features and band combinations supported by UE 700. UE capability transmitting module 706 may be used to transmit the basic UE capability set and the one or more identifiers, indices, or modes of operation to the network after establishing the connection with the network.

Figure 8:
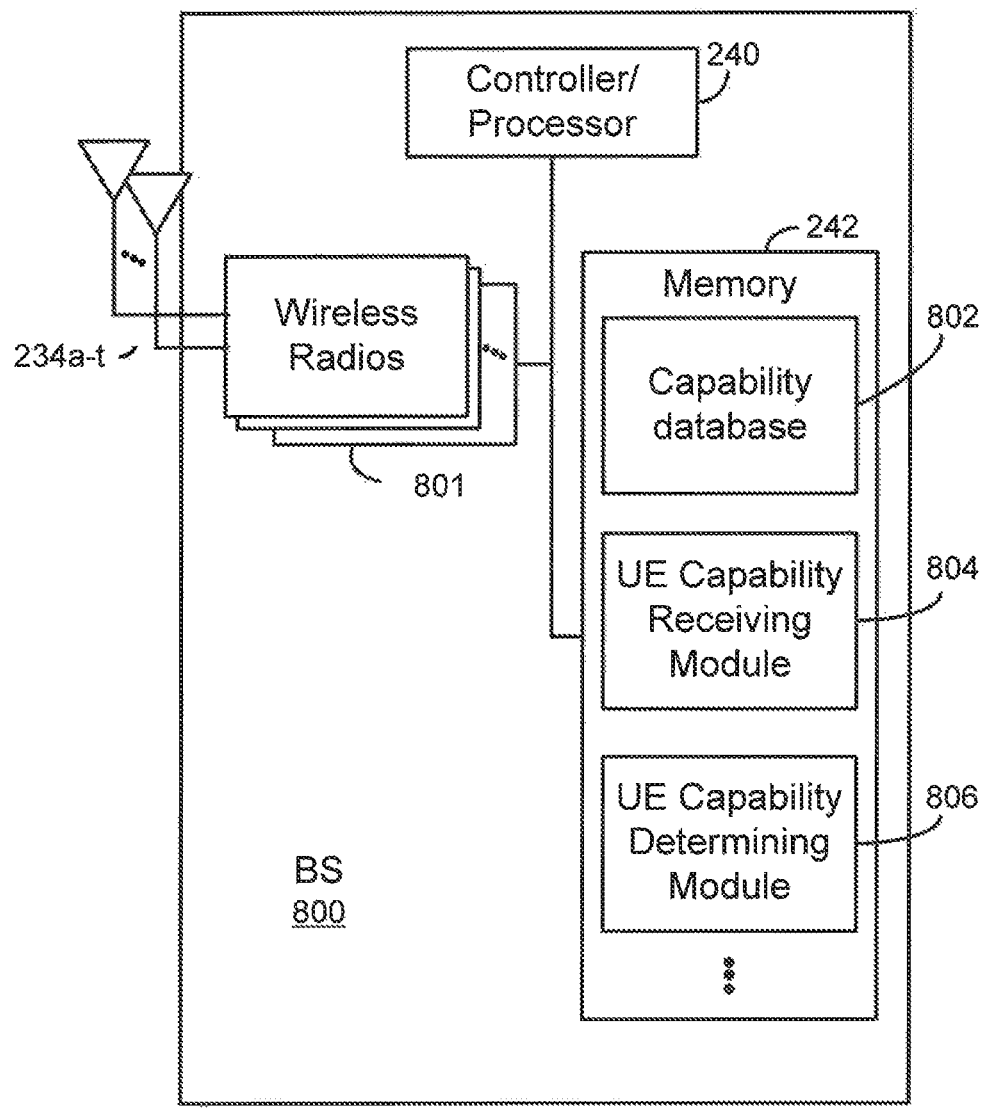
FIG. 8 is a block diagram of a base station in a communication network according to one aspect of the present disclosure.

FIG. 8 is a block diagram of a base station 800 in a communication network according to one aspect of the present disclosure. Base station 800 may have the same or similar configuration as the configuration of base station 105 and BS 404, as illustrated in FIGS. 1, 2, and 4. Base station 800 may include controller/processor 240 to perform or direct the execution of various processes or program codes stored in memory 242. Base station 800 may further include wireless radios 801 to process uplink or downlink signals received from antennas 234*a-t*. Memory 242 may store capability database 802 and program codes for execution of UE capability receiving module 804, UE capability determining module 806, or other modules/applications. Capability database 802 may store one or more identifiers, indices, modes of operation, a set of UE capabilities corresponding to the identifiers, indices, or modes of operation. Such data in capability database 802 may fully or partially overlap with data stored in capability database 702 in UE 700. In some aspects of the present disclosure, capability database 702 or 802 may be physically remote from UE 700 or base station 800. UE capability receiving module 804 may be used to receive a basic UE capability set indicating basic UE capabilities for features required to establish connection between UE 700 and base station 800 and one or more identifiers, indices, and modes of operation. UE capability determining module 806 may be used to determine the more extensive UE capabilities for features and band combinations supported by the UE based on the received one or more identifiers, indices, or modes of operation and data stored in capability database 802.

FIG. 6A is a functional block diagram illustrating exemplary blocks executed by a UE to implement further aspects of the present disclosure. The example blocks may be implemented by UE 115, UE 402, or UE 700, as illustrated in FIGS. 1, 2, 4, and 7. The UE may reduce the message size of UE capability information by filtering out part of the UE capability information. At block 600, the UE may determine UE capabilities to be reported to a network based on one or more of: one or more enquiries from the network, received system information, a home operator policy, configuration associated public land mobile network (PLMN) information of one or more networks, a user preference, or a service type. The one or more enquiries from the network may be used to request for UE capabilities associated with specific bands, UE capabilities associated with the network's support of understanding skipped fall back band combinations, or UE capabilities associated with a maximum number of carriers or bandwidth advertised by the network. For example, in response to the enquiries, the UE may only transmit UE capabilities for the bands identified by the network. As a further example, the UE may allow to avoid transmitting UE capabilities for the skipped fall back band combinations as such skipped fall back band combinations are assumed by the network. The system information or home operator policy may be received and utilized by the UE. For example, a home operator may instruct the UE not to report all the capability information when roaming as another home operator may not be trustworthy. The configuration may be stored with the UE in a UE profile and indicate PLMN information for one or more networks. The UE may report lower capabilities based on a user preference or high demand services. At block 602, the UE may transmit the determined UE capabilities to the network.

FIG. 6B is a functional block diagram illustrating exemplary blocks executed by a base station to implement further aspects of the present disclosure. The example blocks may be implemented by base station 105, BS 404, or BS 800, as illustrated in FIGS. 1, 2, 4, and 8. At block 604, the base station may transmit one or more enquiries for UE capabilities associated with one or more of: one or more bands that are used by a network, a maximum number of carriers or bandwidth advertised by the network on uplink or downlink, or support of understanding skipped fall back band combinations by the network. At block 606, the base station may receive the associated UE capabilities. In some aspects of the present disclosure, the base station may receive UE capabilities determined based on one or more of: system information, a home operator policy, configuration associated with PLMN information of one or more networks, a user preference, or a service type.

Figure 9:
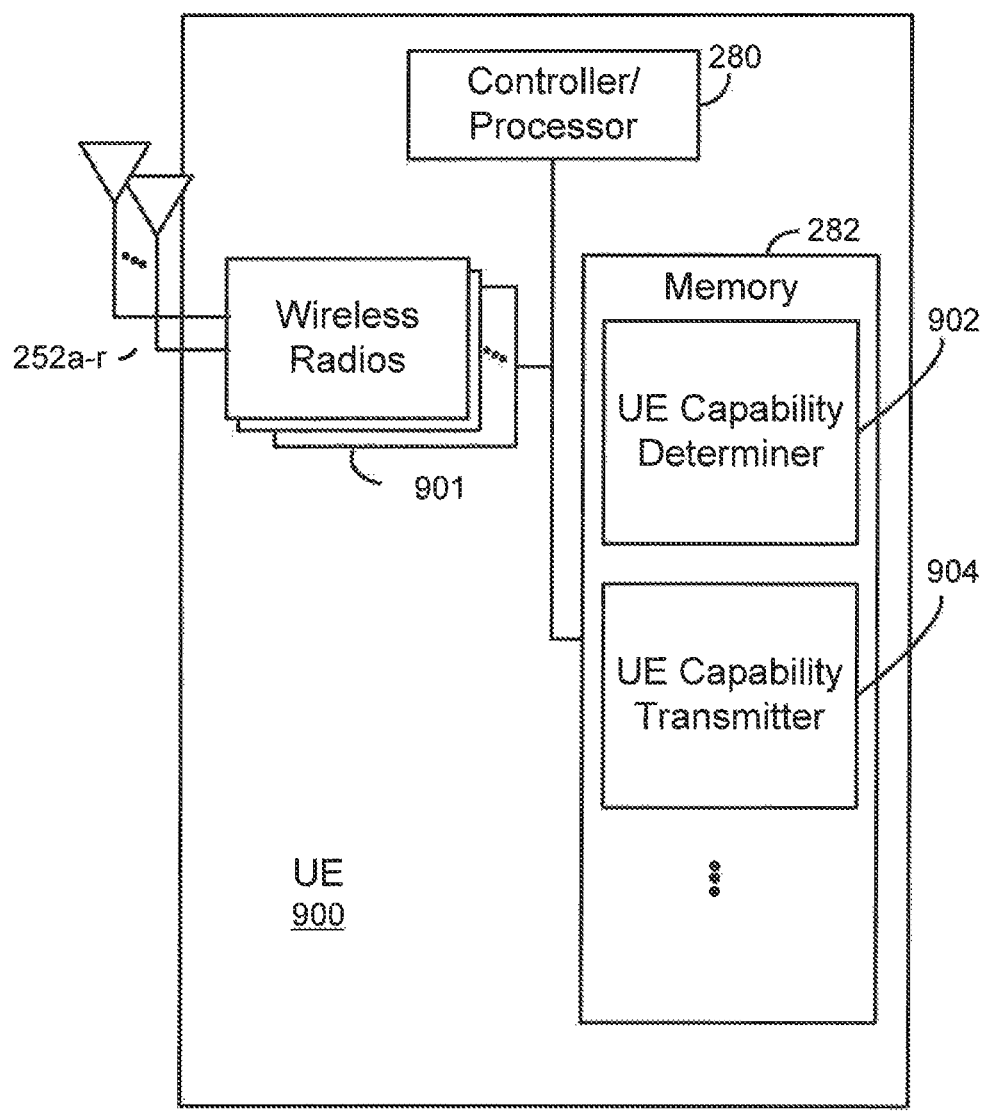
FIG. 9 is a block diagram of a UE in a communication network according to further aspects of the present disclosure.

FIG. 9 is a block diagram of a UE 900 in a communication network according to further aspects of the present disclosure. UE 900 may have the same or similar configuration as the configuration of UE 115 and UE 402, as illustrated in FIGS. 1, 2, and 4. UE 900 may include controller/processor 280 to perform or direct the execution of various processes or program codes stored in memory 282. UE 900 may further include wireless radios 901 to process uplink or downlink signals received from antennas 252*a-r*. Memory 282 may store program codes for execution of UE capability determiner 902, UE capability transmitter 904, or other modules/applications. UE capability determiner 902 may be used to determine UE capabilities to be reported to a network based on one or more of: one or more enquiries from the network, received system information, a home operator policy, configuration associated PLMN information of one or more networks, a user preference, or a service type. UE capability transmitter 904 may be used to transmit the determined UE capabilities.

Figure 10:
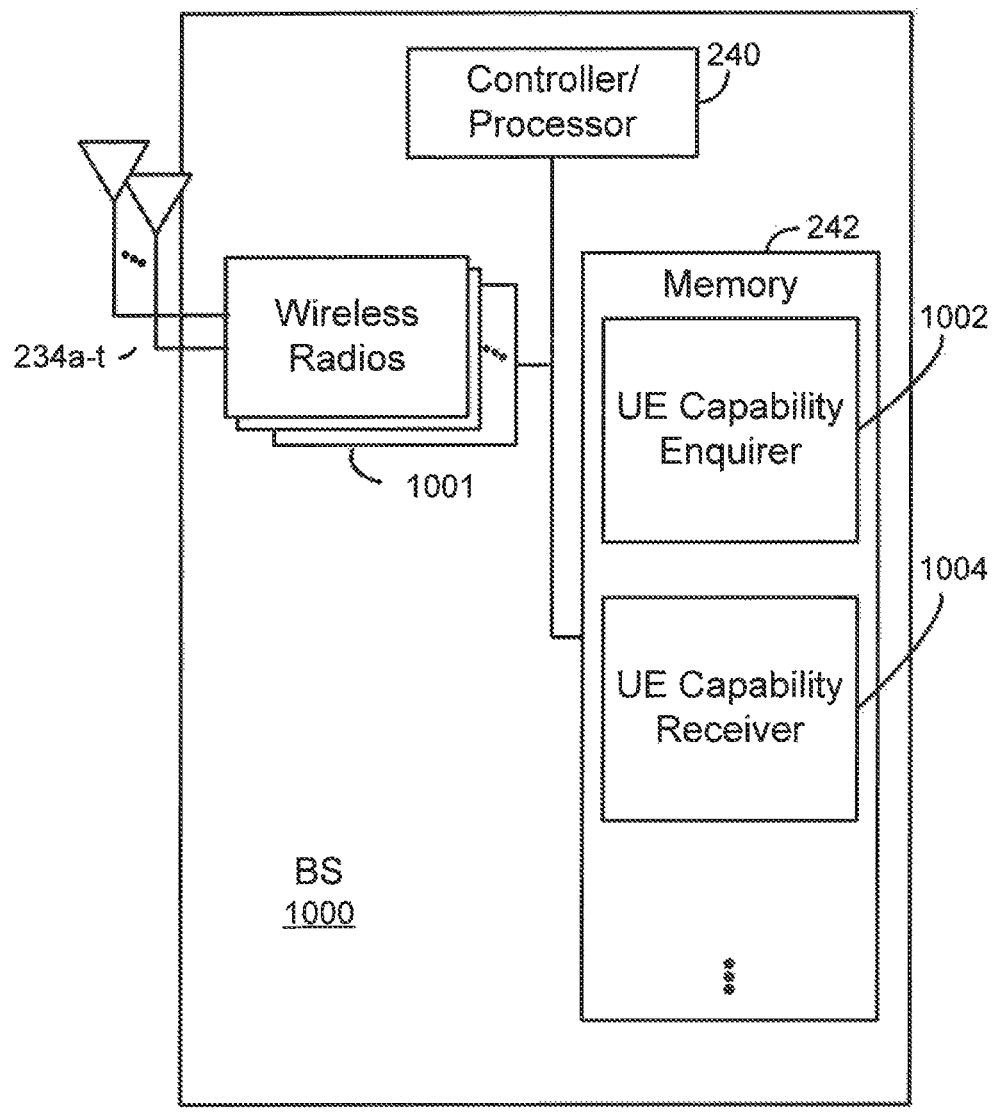
FIG. 10 is a block diagram of a base station in a communication network according to further aspects of the present disclosure.

FIG. 10 is a block diagram of a base station 1000 in a communication network according to further aspects of the present disclosure. Base station 800 may have the same or similar configuration as the configuration of base station 105 and BS 404, as illustrated in FIGS. 1, 2, and 4. Base station 1000 may include controller/processor 240 to perform or direct the execution of various processes or program codes stored in memory 242. Base station 1000 may further include wireless radios 1001 to process uplink or downlink signals received from antennas 234*a-t*. Memory 242 may store UE capability enquirer 1002, UE capability receiver 1004, or other modules/applications. UE capability enquirer 1002 may be used to transmit one or more enquiries for UE capabilities associated with one or more of: one or more bands that are used by a network, a maximum number of carriers or bandwidth advertised by the network on uplink or downlink, or support of understanding skipped fall back band combinations by the network. UE capability receiver 1004 may be used to receive the associated UE capabilities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5-10 may comprise or be executed by processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
transmitting, by a base station, one or more enquiries for user equipment (UE) capabilities associated with one or more of: one or more bands that are used by a network, a maximum number of carriers or bandwidth advertised by the network on uplink or downlink, or support of understanding skipped fall back band combinations by the network;
receiving, by the base station, the associated UE capabilities and an identifier that identifies a portion of UE capabilities for features and band combinations supported by the UE for a mode of operation of multiple modes of operation of the UE; and
accessing, by the base station, a capability database to determine, based on the identifier, the portion of UE capabilities for features and band combinations supported by the UE.

2. The method of claim 1, wherein the UE capabilities associated with the support of understanding skipped fall back band combinations by the network allow the UE to avoid transmitting UE capabilities for the skipped fall back band combinations.

3. The method of claim 1, further comprising receiving UE capabilities determined based on one or more of: system information, a home operator policy, configuration associated with public land mobile network (PLMN) information of one or more networks, a user preference, or a service type.

4. The method of claim 1, wherein the transmitting the one or more enquiries is through a Boolean or over-the-air to the UE.

5. The method of claim 1, further comprising transmitting at least part of the associated UE capabilities to another base station within a same network to avoid transmission of an enquiry to the UE for the at least part of the associated UE capabilities by the other base station.

6. The method of claim 5, further comprising transmitting a tag along with the at least part of the associated UE capabilities, wherein the tag indicates an association between the at least part of the associated UE capabilities and the UE.

7. The method of claim 1, wherein the receiving includes receiving a UE capability set for connection establishment.

8. The method of claim 7, wherein the receiving further includes receiving one or more identifiers after the connection establishment.

9. The method of claim 1, wherein the receiving includes receiving one or more identifiers that include one or more of: an index indicating one or more band combinations, a release identifier, a device type identifier, or a feature specific identifier.

10. A wireless communication apparatus, comprising:
means for transmitting, by a base station, one or more enquiries for user equipment (UE) capabilities associated with one or more of: one or more bands that are used by a network, a maximum number of carriers or bandwidth advertised by the network on uplink or downlink, or support of understanding skipped fall back band combinations by the network;
means for receiving, by the base station, the associated UE capabilities and an identifier that identifies a portion of UE capabilities for features and band combinations supported by the UE for a mode of operation of multiple modes of operation of the UE; and
means for determining, by the base station by accessing a capability database that maps identifiers to UE capabilities for features and band combination supported by one or more UEs, the portion of UE capabilities for features and band combinations supported by the UE based on the received identifier.

11. The apparatus of claim 10, wherein the UE capabilities associated with the support of understanding skipped fall back band combinations by the network allow the UE to avoid transmitting UE capabilities for the skipped fall back band combinations.

12. The apparatus of claim 10, further comprising means for receiving UE capabilities determined based on one or more of: system information, a home operator policy, configuration associated with public land mobile network (PLMN) information of one or more networks, a user preference, or a service type.

13. The apparatus of claim 10, wherein the means for transmitting the one or more enquiries does so through a Boolean or over-the-air to the UE.

14. The apparatus of claim 10, wherein the means for receiving includes means for receiving a UE capability set for connection establishment.

15. The apparatus of claim 14, wherein the means for receiving further includes means for receiving one or more identifiers after the connection establishment.

16. The apparatus of claim 10, wherein the means for receiving includes means for receiving one or more identifiers that include one or more of: an index indicating one or more band combinations, a release identifier, a device type identifier, or a feature specific identifier.

17. A wireless communication apparatus, comprising:
at least one computer processor; and
a memory coupled to the at least one computer processor, wherein the at least one computer processor is adapted to:
transmit, by a base station, one or more enquiries for user equipment (UE) capabilities associated with one or more of: one or more bands that are used by a network, a maximum number of carriers or bandwidth advertised by the network on uplink or downlink, or support of understanding skipped fall back band combinations by the network;

receive, by the base station, the associated UE capabilities and an identifier that identifies a portion of UE capabilities for features and band combinations supported by the UE for a mode of operation of multiple modes of operation of the UE; and access, by the base station, a capability database to determine, based on the identifier, the portion of UE capabilities for features and band combinations supported by the UE.

18. The apparatus of claim 17, wherein the UE capabilities associated with the support of understanding skipped fall back band combinations by the network allow the UE to avoid transmitting UE capabilities for the skipped fall back band combinations.

19. The apparatus of claim 17, wherein the at least one computer processor is further adapted to receive UE capabilities determined based on one or more of: system information, a home operator policy, configuration associated with public land mobile network (PLMN) information of one or more networks, a user preference, or a service type.

20. The apparatus of claim 17, wherein the at least one computer processor is adapted to transmit the one or more enquiries through a Boolean or over-the-air to the UE.

21. The apparatus of claim 17, wherein the at least one computer processor is further adapted to transmit at least part of the associated UE capabilities to another base station within a same network to avoid transmission of an enquiry to the UE for the at least part of the associated UE capabilities by the other base station.

22. The apparatus of claim 21, wherein the at least one computer processor is further adapted to transmit a tag along with the at least part of the associated UE capabilities, wherein the tag indicates an association between the at least part of the associated UE capabilities and the UE.

23. The apparatus of claim 17, wherein the at least one computer processor is further adapted to receive at least in part by receiving a UE capability set for connection establishment.

24. The apparatus of claim 23, wherein the at least one computer processor is further adapted to receive at least in part by receiving one or more identifiers after the connection establishment.

25. The apparatus of claim 17, wherein the at least one computer processor is further adapted to receive at least in part by receiving one or more identifiers that include one or more of: an index indicating one or more band combinations, a release identifier, a device type identifier, or a feature specific identifier.

26. A non-transitory computer-readable medium having program code recorded thereon, the program code comprising:

program code executable by a computer for causing the computer to transmit, by a base station, one or more enquiries for user equipment (UE) capabilities associated with one or more of: one or more bands that are used by a network, a maximum number of carriers or bandwidth advertised by the network on uplink or downlink, or support of understanding skipped fall back band combinations by the network;

program code executable by the computer for causing the computer to receive, by the base station, the associated UE capabilities and an identifier that identifies a portion of UE capabilities for features and band combinations supported by the UE for a mode of operation of multiple modes of operation of the UE; and program code executable by the computer for causing the computer to access, by the base station, a capability database to determine, based on the identifier, the portion of UE capabilities for features and band combinations supported by the UE.

27. A method of wireless communication, comprising:

accessing, by a user equipment (UE), a capability database to determine an identifier that identifies a portion of UE capabilities for features and band combinations supported by the UE for a mode of operation of multiple modes of operation of the UE;

determining, by the UE, UE capabilities to be reported to a network based on one or more of: one or more enquiries from the network, received system information, a home operator policy, configuration associated with public land mobile network (PLMN) information of one or more networks, a user preference, or a service type; and transmitting, by the UE, the determined UE capabilities and the identifier.

28. The method of claim 27, wherein the one or more enquiries from the network are to request for one or more of the UE capabilities associated with one or more of: one or more bands that are used by a network, a maximum number of carriers or bandwidth advertised by the network on uplink or downlink, or support of understanding skipped fall back band combinations by the network.

29. The method of claim 28, wherein the one or more of the UE capabilities associated with the support of understanding skipped fall back band combinations by the network allow the UE to avoid transmitting UE capabilities for the skipped fall back band combinations.

30. The method of claim 27, wherein the transmitting includes transmitting at least part of the determined UE capabilities to establish connection with the network.

31. The method of claim 30, wherein the transmitting includes transmitting one or more identifiers to the network after establishing the connection, wherein the one or more identifiers include one or more of: an index indicating band combinations, a release identifier, a device type identifier, or a feature specific identifier.

32. The method of claim 27, wherein the transmitting includes transmitting one or more identifiers that include one or more of: an index indicating band combinations, a release identifier, a device type identifier, or a feature specific identifier.

33. The method of claim 32, wherein each of the one or more identifiers identifies a set of UE capabilities and is determined based on one or more of: a pre-defined 3GPP Standard, a definition provided by a network operator, or a database provided by a UE vendor.

34. The method of claim 27, further comprising:

providing a tag indicating an association between the determined UE capabilities and the UE; and transmitting the tag along with at least part of the determined UE capabilities.

35. The method of claim 27, further comprising receiving one or more enquiries from the network for the determined UE capabilities.

36. The method of claim 35, wherein the one or more enquiries are transmitted through a Boolean or over-the-air from the network.

37. The method of claim 27, further comprising indicating a change of mode of operation triggered by a change of UE capabilities.

38. A wireless communication apparatus, comprising:
accessing, by a user equipment (UE), a capability database to determine an identifier that identifies a portion of UE capabilities for features and band combinations supported by the UE for a mode of operation of multiple modes of operation of the UE;
means for determining, by the UE, UE capabilities to be reported to a network based on one or more of: one or more enquiries from the network, received system information, a home operator policy, configuration associated with public land mobile network (PLMN) information of one or more networks, a user preference, or a service type; and
means for transmitting, by the UE, the determined UE capabilities and the identifier.

39. The apparatus of claim 38, wherein the one or more enquiries from the network are to request for one or more of the UE capabilities associated with one or more of: one or more bands that are used by a network, a maximum number of carriers or bandwidth advertised by the network on uplink or downlink, or support of understanding skipped fall back band combinations by the network.

40. The apparatus of claim 39, wherein the one or more of the UE capabilities associated with the support of understanding skipped fall back band combinations by the network allow the UE to avoid transmitting UE capabilities for the skipped fall back band combinations.

41. The apparatus of claim 38, wherein the means for transmitting includes means for transmitting at least part of the determined UE capabilities to establish connection with the network.

42. The apparatus of claim 41, wherein the means for transmitting includes means for transmitting one or more identifiers to the network after establishing the connection, wherein the one or more identifiers include one or more of: an index indicating band combinations, a release identifier, a device type identifier, or a feature specific identifier.

43. The apparatus of claim 38, wherein the means for transmitting includes means for transmitting one or more identifiers that include one or more of: an index indicating band combinations, a release identifier, a device type identifier, or a feature specific identifier.

44. The apparatus of claim 43, wherein each of the one or more identifiers identifies a set of UE capabilities and is determined based on one or more of: a pre-defined 3GPP Standard, a definition provided by a network operator, or a database provided by a UE vendor.

45. The apparatus of claim 38, further comprising:
means for providing a tag indicating an association between the determined UE capabilities and the UE; and
means for transmitting the tag along with at least part of the determined UE capabilities.

46. The apparatus of claim 38, further comprising means for receiving one or more enquiries from the network for the determined UE capabilities.

47. The apparatus of claim 46, wherein the one or more enquiries are transmitted through a Boolean or over-the-air from the network.

48. The apparatus of claim 38, further comprising means for indicating a change of mode of operation triggered by a change of UE capabilities.

49. A wireless communication apparatus, comprising:
at least one computer processor; and
a memory coupled to the at least one computer processor, wherein the at least one computer processor is configured to:
access, by a user equipment (UE), a capability database to determine an identifier that identifies a portion of UE capabilities for features and band combinations supported by the UE for a mode of operation of multiple modes of operation of the UE;
determine, by the UE, UE capabilities to be reported to a network based on one or more of: one or more enquiries from the network, received system information, a home operator policy, configuration associated with public land mobile network (PLMN) information of one or more networks, a user preference, or a service type; and
transmit, by the UE, the determined UE capabilities and the identifier.

50. The apparatus of claim 49, wherein the one or more enquiries from the network are to request for one or more of the UE capabilities associated with one or more of: one or more bands that are used by a network, a maximum number of carriers or bandwidth advertised by the network on uplink or downlink, or support of understanding skipped fall back band combinations by the network.

51. The apparatus of claim 50, wherein the one or more of the UE capabilities associated with the support of understanding skipped fall back band combinations by the network allow the UE to avoid transmitting UE capabilities for the skipped fall back band combinations.

52. The apparatus of claim 49, wherein the at least one computer processor is configured to transmit at least in part by transmitting at least part of the determined UE capabilities to establish connection with the network.

53. The apparatus of claim 52, wherein the at least one computer processor is configured to transmit at least in part by transmitting one or more identifiers to the network after establishing the connection, wherein the one or more identifiers include one or more of: an index indicating band combinations, a release identifier, a device type identifier, or a feature specific identifier.

54. The apparatus of claim 49, wherein the at least one computer processor is configured to transmit at least in part by transmitting one or more identifiers that include one or more of: an index indicating band combinations, a release identifier, a device type identifier, or a feature specific identifier.

55. The apparatus of claim 54, wherein each of the one or more identifiers identifies a set of UE capabilities and is determined based on one or more of: a pre-defined 3GPP Standard, a definition provided by a network operator, or a database provided by a UE vendor.

56. The apparatus of claim 49, wherein the at least one computer processor is further configured to:
provide a tag indicating an association between the determined UE capabilities and the UE; and
transmit the tag along with at least part of the determined UE capabilities.

57. The apparatus of claim 49, wherein the at least one computer processor is further configured to receive one or more enquiries from the network for the determined UE capabilities.

58. The apparatus of claim 57, wherein the one or more enquiries are transmitted through a Boolean or over-the-air from the network.

59. The apparatus of claim 49, wherein the at least one computer processor is further configured to indicate a change of mode of operation triggered by a change of UE capabilities.

60. A non-transitory computer-readable medium having program code recorded thereon, the program code comprising:
- program code executable by a computer for causing the computer to access, by a user equipment (UE), a capability database to determine an identifier that identifies a portion of UE capabilities for features and band combinations supported by the UE for a mode of operation of multiple modes of operation of the UE;
- program code executable by a computer for causing the computer to determine, by the UE, UE capabilities to be reported to a network based on one or more of: one or more enquiries from the network, received system information, a home operator policy, configuration associated with public land mobile network (PLMN) information of one or more networks, a user preference, or a service type; and
- program code executable by the computer for causing the computer to transmit, by the UE, the determined UE capabilities.

* * * * *